United States Patent [19]

Webb, Jr. et al.

[11] Patent Number: 4,985,825
[45] Date of Patent: Jan. 15, 1991

[54] SYSTEM FOR DELAYING PROCESSING OF MEMORY ACCESS EXCEPTIONS UNTIL THE EXECUTION STAGE OF AN INSTRUCTION PIPELINE OF A VIRTUAL MEMORY SYSTEM BASED DIGITAL COMPUTER

[75] Inventors: David A. Webb, Jr., Berlin; David B. Fite; Ricky C. Hetherington, both of Northboro; Francis X. McKeen, Westboro; Mark A. Firstenberg, Maynard; John E. Murray, Acton; Dwight P. Manley, Holliston; Ronald M. Salett, Framingham; Tryggve Fossum, Northboro, all of Mass.

[73] Assignee: Digital Equipment Corporation, Maynard, Mass.

[21] Appl. No.: 306,866

[22] Filed: Feb. 3, 1989

[51] Int. Cl.⁵ .................... G06F 9/38; G06F 11/30; G06F 12/10
[52] U.S. Cl. ................... 364/200; 364/231.8; 364/256.3; 364/265.3; 364/265.6
[58] Field of Search ... 364/200 MS File, 900 MS File

[56] References Cited

U.S. PATENT DOCUMENTS

| | | | |
|---|---|---|---|
| 3,949,379 | 4/1976 | Ball | 364/200 |
| 4,476,525 | 10/1984 | Ishii | 364/200 |
| 4,500,959 | 2/1985 | Kubo et al. | 364/200 |
| 4,656,578 | 4/1987 | Chilinsky et al. | 364/200 |
| 4,710,866 | 12/1987 | Zolnowsky et al. | 364/200 |
| 4,757,445 | 7/1988 | Zolnowsky et al. | 364/200 |
| 4,875,160 | 10/1989 | Brown, III | 364/200 |

OTHER PUBLICATIONS

Fossum et al., "An Overview of the VAX 8600 System," Digital Technical Journal, No. 1, Aug. 1985, pp. 8-23.
Troiani et al., "The VAX 8600 I Box, A Pipelined Implementation of the VAX Architecture," Digital Technical Journal, No. 1, Aug. 1985, pp. 24-42.
Bruckert et al., "Designing Reliability into the VAX 8600 System," Digital Technical Journal, No. 1, Aug. 1985, pp. 71-77.

Primary Examiner—Thomas C. Lee
Attorney, Agent, or Firm—Arnold, White & Durkee

[57] ABSTRACT

A technique for processing memory access exceptions along with pre-fetched instructions in a pipelined instruction processing computer system is based upon the concept of pipelining exception information along with other parts of the instruction being executed. In response to the detection of access exceptions at a pipeline stage, corresponding fault information is generated and transferred along the pipeline. The fault information is acted upon only when the instruction reaches the execution stage of the pipeline. Each stage of the instruction pipeline is ported into the front end of a memory unit adapted to perform the virtual-to-physical address translation; each port being provided with storage for virtual addresses accompanying an instruction as well as storage for corresponding fault information. When a memory access exception is encountered at the front end of the memory unit, the fault information generated therefrom is loaded into the storage and the port is prevented from accepting further references.

11 Claims, 7 Drawing Sheets

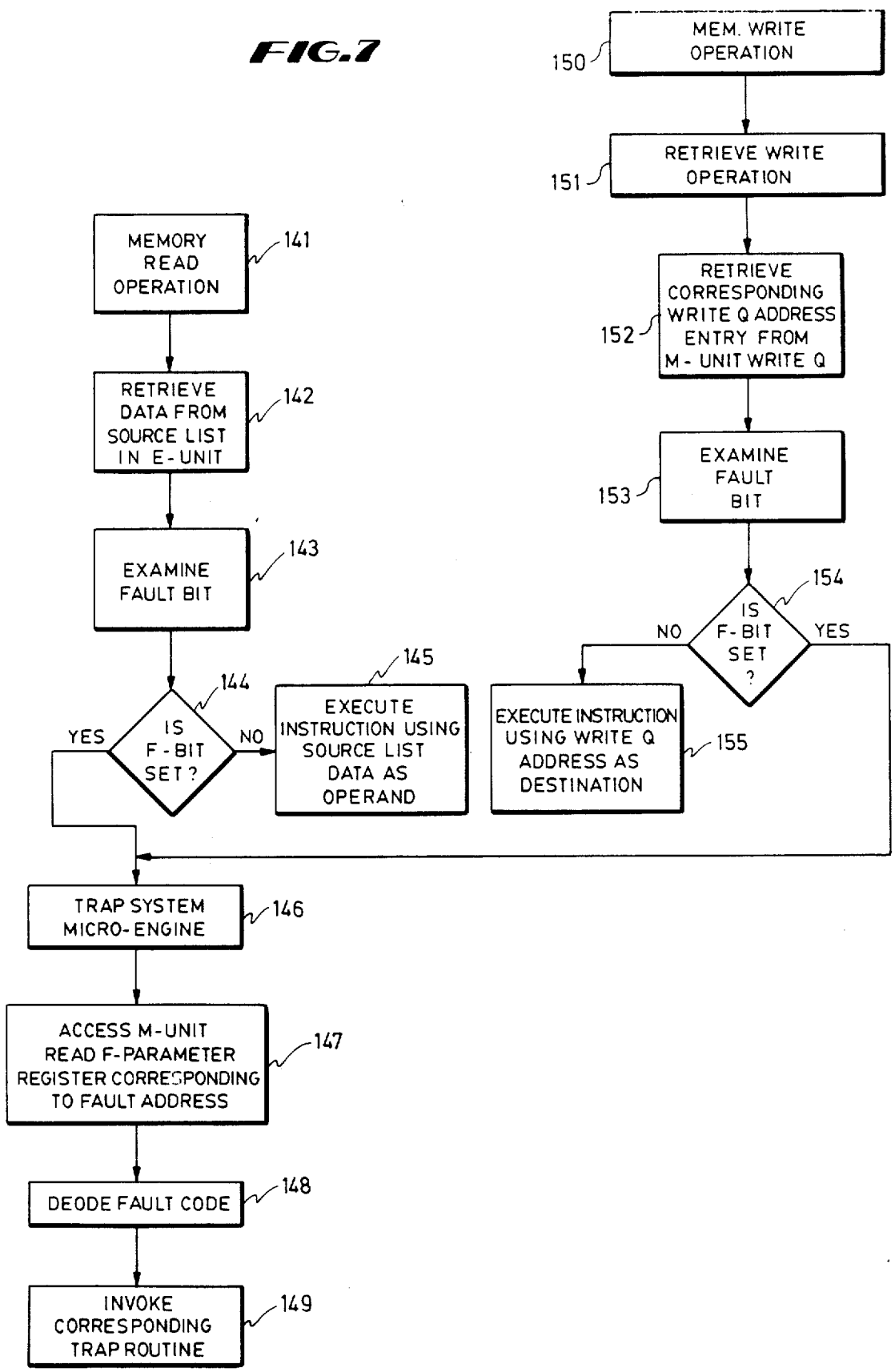

SYSTEM FOR DELAYING PROCESSING OF MEMORY ACCESS EXCEPTIONS UNTIL THE EXECUTION STAGE OF AN INSTRUCTION PIPELINE OF A VIRTUAL MEMORY SYSTEM BASED DIGITAL COMPUTER

RELATED APPLICATIONS

The present application discloses certain aspects of a computing system that is further described in the following U.S. patent applications filed concurrently with the present application: Evans et al., AN INTERFACE BETWEEN A SYSTEM CONTROL UNIT AND A SERVICE PROCESSING UNIT OF A DIGITAL COMPUTER, U.S. Ser. No. 07/306,325, filed Feb. 3, 1989; Arnold et al., METHOD AND APPARATUS FOR INTERFACING A SYSTEM CONTROL UNIT FOR A MULTIPROCESSOR SYSTEM WITH THE CENTRAL PROCESSING UNITS, U.S. Ser. No. 07/306,837, filed Feb. 3, 1989; Gagliardo et al., METHOD AND MEANS FOR INTERFACING A SYSTEM CONTROL UNIT FOR A MULTI-PROCESSOR SYSTEM WITH THE SYSTEM MAIN MEMORY, U.S. Ser. No. 07/306,326, filed Feb. 3, 1989; D. Fite et al., METHOD AND APPARATUS FOR RESOLVING A VARIABLE NUMBER OF POTENTIAL MEMORY ACCESS CONFLICTS IN A PIPELINED COMPUTER SYSTEM, U.S. Ser. No. 07/306,767, filed Feb. 3, 1989; D. Fite et al., DECODING MULTIPLE SPECIFIERS IN A VARIABLE LENGTH INSTRUCTION ARCHITECTURE, U.S. Ser. No. 07/306,347, filed Feb. 3, 1989; D. Fite et al., VIRTUAL INSTRUCTION CACHE REFILL ALGORITHM, U.S. Ser. No. 07/306,831, now U.S. Pat. No. 4,902,448, filed Feb. 3 1989; Herman et al., PIPELINE PROCESSING OF REGISTER AND REGISTER MODIFYING SPECIFIERS WITHIN THE SAME INSTRUCTION U.S. Ser. No. 07/306,833, filed Feb. 3, 1989; Murray et al., MULTIPLE INSTRUCTION PREPROCESSING SYSTEM WITH DATA DEPENDENCY RESOLUTION FOR DIGITAL COMPUTERS, U.S. Ser. No. 07/306,773, filed Feb. 3, 1989; D. Fite et al., PREPROCESSING IMPLIED SPECIFIERS IN A PIPELINED PROCESSOR, U.S. Ser. No. 07/306,846, filed Feb. 3, 1989; D. Fite et al., BRANCH PREDICTION, U.S. Ser. No. 07,306,760, filed Feb. 3, 1989; Fossum et al., PIPELINED FLOATING POINT ADDER FOR DIGITAL COMPUTER, U.S. Ser. No. 07/306,343, filed Feb. 3, 1989; Grundmann et al., SELF TIMED REGISTER FILE, U.S. Ser. No. 07/306,445, filed Feb. 3, 1989; Beaven et al., METHOD AND APPARATUS FOR DETECTING AND CORRECTING ERRORS IN A PIPELINED COMPUTER SYSTEM, U.S. Ser. No. 07,306,828, filed Feb. 3, 1989; Flynn et al., METHOD AND MEANS FOR ARBITRATING COMMUNICATION REQUESTS USING A SYSTEM CONTROL UNIT IN A MULTI-PROCESSOR SYSTEM U.S. Ser. No. 07/306,871, filed Feb. 3, 1989; E. Fite et al., CONTROL OF MULTIPLE FUNCTION UNITS WITH PARALLEL OPERATION IN A MICROCODED EXECUTION UNIT, U.S. Ser. No. 07/306,832, filed Feb. 3, 1989; Hetherington et al., METHOD AND APPARATUS FOR CONTROLLING THE CONVERSION OF VIRTUAL TO PHYSICAL MEMORY ADDRESSES IN A DIGITAL COMPUTER SYSTEM, U.S. Ser. No. 07/306,544, filed Feb. 3, 1989; Hetherington et al., WRITE BACK BUFFER WITH ERROR CORRECTING CAPABILITIES, U.S. Ser. No. 07/306,703, filed Feb. 3, 1989; Flynn et al., METHOD AND MEANS FOR ARBITRATING COMMUNICATION REQUESTS USING A SYSTEM CONTROL UNIT IN A MULTI-PROCESSOR SYSTEM U.S. Ser. No. 07/306,871, filed Feb. 3, 1989; Chinnasway et al., MODULAR CROSSBAR INTERCONNECTION NETWORK FOR DATA TRANSACTIONS BETWEEN SYSTEM UNITS IN A MULTI-PROCESSOR SYSTEM, U.S Ser. No. 07/306,336, filed Feb. 3, 1989; Polzin et al., METHOD AND APPARATUS FOR INTERFACING A SYSTEM CONTROL UNIT FOR A MULTI-PROCESSOR SYSTEM WITH INPUT/OUTPUT UNITS U.S. Ser. No. 07/306,862, filed Feb. 3, 1989; Gagliardo et al., MEMORY CONFIGURATION FOR USE WITH MEANS FOR INTERFACING A SYSTEM CONTROL UNIT FOR A MULTI-PROCESSOR SYSTEM WITH THE SYSTEM MAIN MEMORY, U.S. Ser. No. 07/306,404, filed Feb. 3, 1989; and Gagliardo et al., METHOD AND MEANS FOR ERROR CHECKING OF DRAM-CONTROL SIGNALS BETWEEN SYSTEM MODULES. U.S. Ser. No. 07/306,836, filed Feb. 3, 1989.

TECHNICAL FIELD

This invention relates generally to digital computers based on the virtual memory system. More particularly, this invention relates to a technique for the processing of memory access exceptions along with pre-fetched instructions within the instruction pipeline of a pipelined instruction processing computer system.

DESCRIPTION OF RELATED ART

A computer system using virtual memory is capable of recognizing a large number of addresses (more than 4 billion addresses for a 32-bit computer) defined within a virtual address space. The actual physical main memory of the computer is substantially smaller and yet the system is capable of processing data whose addresses are scattered through the address space. Such capabilities are provided by means of sophisticated memory management techniques which permit a program to be executed under the presumption that a large part of the virtual address space is actually available, thereby providing users with the illusion of a much larger main memory address space than is actually available. By the use of memory mapping and the translation of logical to physical addresses, the virtual memory system provides the computer with contiguous logical memory on noncontiguous physical storage.

Virtual memory systems are generally based on the concept of memory blocking using a combination of either statically or dynamically partitioning a linear array of memory into smaller memory regions and a block address mapping system on the basis of which virtual addresses are translated into block locations and displacements within the block. The mapping process from virtual to physical addressing is typically accomplished by means of a block mapping table which holds an entry containing the block address in memory for each physical memory block and, for variable-size blocked memory systems, the size of the memory block. In such a blocked virtual memory scheme, all physical blocks are of the same size to facilitate the interchanging of block locations in order that a virtual memory block may be placed at any of the physical block locations in memory. Each block of memory is referred to as a memory page and not all of the virtual pages are resident in primary memory at any one time Instead, some means of secondary storage, usually disk, is used to hold the remainder of the pages.

Mapping or translation from virtual to real (physical) addresses in a paged memory system is performed by the use of page tables for each major region of virtual address space that is actively used. The page table is a virtually contiguous array of page table entries, each of which is a long word representing the physical mapping for one virtual page. Translation from a virtual to a physical address is then performed by simply using the virtual page number as an index into the page table from the given page table base address. The page table, among other things, includes a field indicative of whether a memory page is physically located in primary or secondary memory. Memory management and execution logic is used to translate the program's virtual addresses into physical addresses, to store programs and related data in convenient locations (either in main memory or auxiliary memory), and to procure into main memory required data or program segments.

In a virtual memory computer system of the above kind, programs access physical memory and input/output (I/O) devices by generating virtual addresses which are subsequently translated into physical addresses by using parts of the physical address to index into a page table and fetch the corresponding page table entry (PTE) The PTE typically contains information about access privileges, creation of physical addresses, and bits indicative of the modification and validity status of the address. The PTE also contains status bits which are used by the system software to handle access exceptions, such as those occurring when an address page is not resident in memory. The operating system thus provides an image of physical memory which can be accessed by a user without any reference to memory resource location. As a result of the translation process, the operating system subsequently either grants or denies access to addressed segments of memory. If a memory access request is granted, the corresponding memory operation proceeds to conclusion. On the other hand, if an access request is denied, the program execution process is halted and instead an exception handler routine is executed.

When an instruction is to be executed, the virtual memory system hardware generates a virtual address corresponding to the instruction and relays it to the system memory unit along with a request for a memory access operation such as a read or a write. Translation means provided within the memory unit computes the physical address corresponding to the virtual address and the requested memory access operation is executed if the translation process has been successful. If the translation from the virtual address to the physical address is for some reason found to be unsuccessful, the memory unit returns a signal to the instruction processor which causes the initiation of a memory access exception instead of continuing with program execution.

Although the technique of halting program execution upon detection of access exceptions is conceptually straight forward, its application in high performance computers, which typically use multi-processing along with pipelined instruction execution, can be fairly complicated and problematic. High performance computers are generally based on the concept of multi-processing at system level by utilizing a plurality of central processor units to execute a defined task through appropriate problem decomposition. The multi-processing operation is further complemented by the process of pipelining so that computer instructions are divided into a series of smaller and simpler operations which are subsequently executed in a pipeline fashion by several dedicated function units optimized for specific purposes. High speed and extensive connectivity and redundancy is provided in such systems by the use of parallel paths to mass storage and other devices through multiple I/O buses.

Detection and processing of memory access exceptions are complicated in high performance computer systems because the entire sequence of operations required for executing instructions is pipelined. A typical example is the "VAX" brand family of computers from Digital Equipment Corporation, 111 Powdermill Road, Maynard, MA, 01754. The instruction pipeline for the VAX 8600 model computer is described in detail by Fossum et al., in an article entitled "An Overview Of The VAX 8600 System", *Digital Technical Journal,* Number 1, August 1985, pp. 8–23. As described therein, high performance pipelining uses separate pipeline stages for each of the different stages of operation involved in the execution of instructions. The pipeline stages typically include instruction fetching, instruction decoding, operand address generation, operand fetching, instruction execution, and result storage. Processing of memory access exceptions is difficult because several instructions may be active at any one time. In addition, each instruction may activate several memory references, instruction reads, operand reads, operand writes, address reads, and string reads. Further, each of these operations is likely to be performed by different hardware segments at different stages in the instruction pipeline.

Any time a memory reference is made as part of executing an instruction along the instruction pipeline, the address translation process takes place in order to generate physical addresses from virtual addresses provided by the instruction. At each of these translation stages, there is a possibility that a memory access exception may occur. The problem is compounded when the computer system is geared to pre-fetching, while a particular instruction is being acted upon, instructions and operands which are anticipated to be required for execution of subsequent stages of the instruction. If all necessary access exceptions are acted upon at the time the exceptions are detected, the result is that the pipeline quickly stalls when interdependent operation stages are halted to resolve access violations resultant therefrom. Accordingly, a direct conflict exists between achieving high speed, pipelined instruction processing and the relatively low speed sequential processing that results when related memory access exceptions are concurrently implemented. It is thus exceedingly critical that memory exceptions occurring within the pipeline stages be handled in such a way as to avoid the stalling of the instruction pipeline by disruption of other pipeline stages. In the VAX architecture, for instance, this problem is approached by a protocol which insures that exceptions which occur in the reading of memory as part of pre-fetching instructions do not disrupt the execution of previously issued instructions.

SUMMARY OF THE INVENTION

An exception handling scheme is provided that is based upon the concept of pipelining exception information along with other parts of the instruction being executed. According to an important feature of this invention, exception information generated at a pipeline stage is transferred along the pipeline and is acted upon only when the instruction reaches the execution stage of the pipeline. Accordingly, exception handling routines need only be invoked if the exception information is found to be valid and existent at the execution stage. The complicated and time consuming process of resorting to exception handling routines at each stage of the instruction execution pipeline where an exception is found to exist is dispensed with. A major advantage resulting from such a scheme is that, if the instruction stream is altered before an instruction accompanied by an associated exception reaches the execution stage, the exception condition can be dispensed along with the rest of the instruction.

According to a preferred embodiment of this invention, the above scheme is implemented by porting each stage of the instruction pipeline into the front end of a memory unit adapted to perform the virtual to physical translations. The back end of the memory unit is adapted to utilize the physical address produced by the front end to access addressed data in main memory or in cache memories. Each port provided at the front end of the memory unit for a pipeline stage is also provided with means for storing virtual addresses accompanying an instruction as well as means for storing "fault" information concerning detected exceptions. This exception information is acted upon by the system software only at the execution stage. When a memory access exception is encountered in the front end of the memory unit, the fault information generated therefrom is loaded into the storage means and the port is prevented from accepting further references. However, ports corresponding to other pipeline stages are retained as active for receiving memory references. This arrangement permits instructions further along the pipeline to be completed without being disrupted by faults or exceptions encountered in preceding stages of the instruction stream.

According to another feature of this invention, means are provided for synchronizing the exception handling process to the instruction execution process. Faults located in the pipeline stages before an instruction passes the issue stage are pipelined along with (or instead of) data and control words derived from instruction pre-processing and operand pre-fetching. The fault pipeline is checked at the point when this data and control is required for issuing an instruction at the execution stage; if a fault or exception is found, an exception is initiated instead of issuing the instruction. In this manner, all instructions existing in the pipeline stages following the issue stage are allowed to complete without any obstruction.

According to another important feature of this invention, destination operand addresses for memory write operations are calculated in the operand processing unit stage of the pipeline and subsequently passed onto the memory unit for translation. Corresponding write operations are usually postponed because data is not available until after the execution stage and the translated destination addresses are stored within a write queue and are subsequently paired with the corresponding data received following the execution stage. When instructions are being retired, it is imperative that the memory destinations to be written be defined at that point. Because the destination addresses have been pre-translated, it becomes possible for instructions to be conveniently retired at or following the execution stage as long as corresponding valid entries exist in the data write queue.

In summary, the pipeline stages put out memory references as required and the task to be performed by the pipeline stage is completed in the usual manner if the address translation corresponding to the memory reference is successful; in this case, data relevant to the pipeline stage is used to execute the instruction eventually at the execution stage. However, if the address translation corresponding to the memory reference is unsuccessful, fault information is generated and the port corresponding to the pipeline stage in the memory unit is designated as closed. The fault information generated by the memory unit is propagated through the pipeline and is eventually used at the execution stage as a basis for invoking a fault handler routine on the basis of the fault or exception information.

BRIEF DESCRIPTION OF THE DRAWINGS

Other objects and advantages of the invention will become apparent upon reading the following detailed description and upon reference to the drawings in which:

FIG. 7 is a simplified flowchart illustrating the operations involved in detecting and responding to fault information, according to this invention. While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Figure 1:
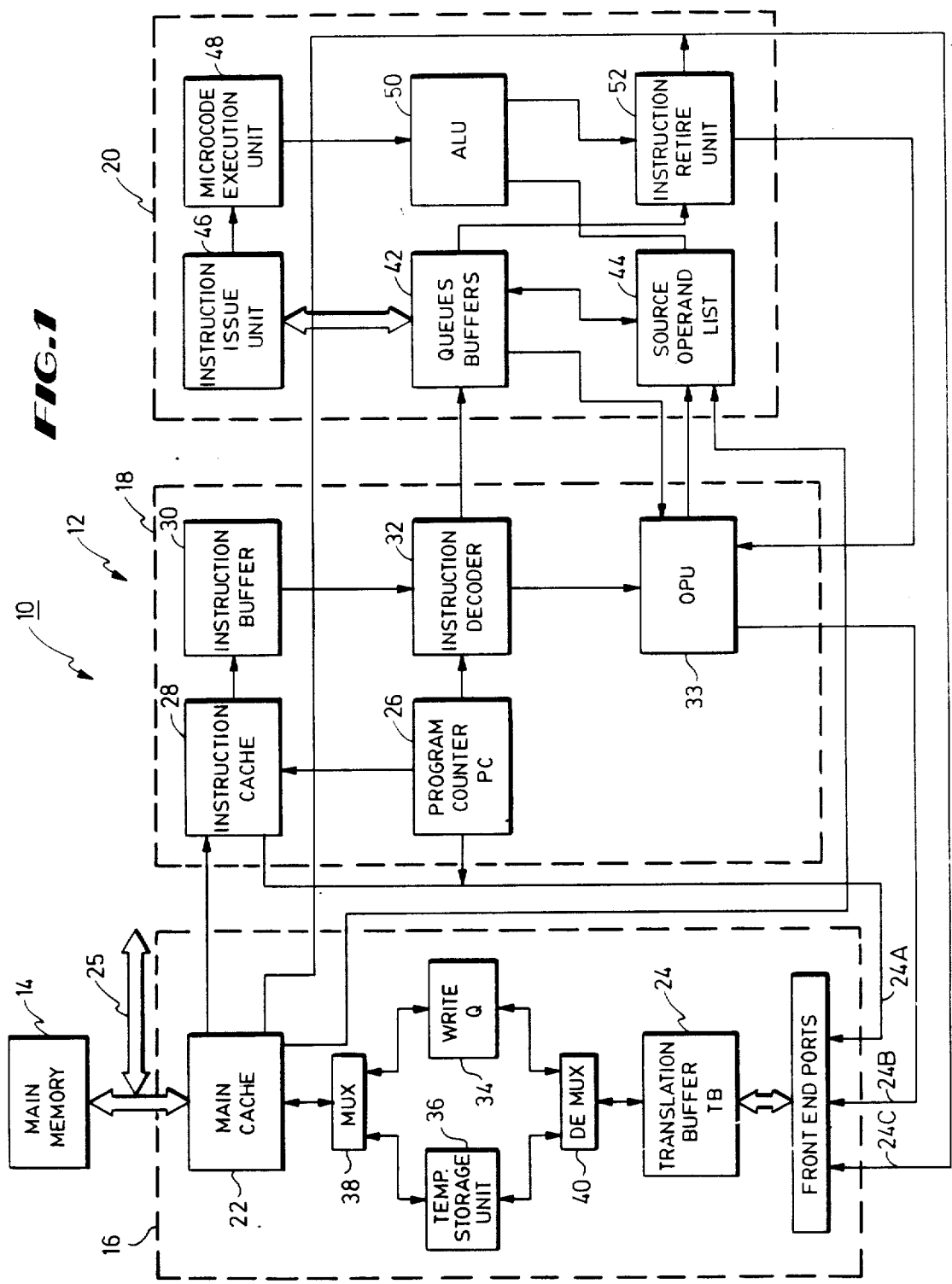
FIG. 1 is a simplified block diagram of a pipelined virtual memory-based computer system adapted to the scheme for processing memory access exceptions according to this invention.

Referring now to FIG. 1, there is shown a top level block diagram of a pipelined virtual memory-based computer system 10 which uses one or more central processing units (CPUs) 12 and is configured to permit simultaneous, i e., parallel, operation of all system CPUs by permitting them to share a common main memory 14 for the system. In a practical implementation, up to four CPUs may be operated simultaneously in such a system by efficiently sharing the main memory 14. In accordance with the concept of pipelining, the CPU 12 is a non-homogeneous processor which includes a set of special-purpose functional units dedicated to and optimized for performing specific tasks into which individual instructions are split prior to execution.

According to the pipelining technique, each basic operation (such as addition, multiplication, etc.) is broken down into a number of independent stages, quite analogous to the manner in which a manufacturing assembly line is organized. Assuming that each stage requires "t" seconds for completion, an operand pair finishes with a stage each t seconds and is subsequently passed on to the next stage, allowing a new operand pair to begin. In the case of an instruction requiring, for example, four independent stages (as in the case of a floating-point addition operation requiring the four separate stages of exponent subtraction, mantissa alignment, mantissa add, and result normalization) a time period of 4t seconds is required from beginning to end of the execution process. However, what is significant is that a new result can be produced every t seconds. In other words, as each dedicated stage proceeds with executing the task that is allotted to it, the subject instruction moves closer to being completed. At the final stage in the pipeline, each time a task is completed with the passing of a system cycle, a new result signifying the completion of an instruction is produced. Although such a pipeline generally takes longer than normal to perform a single operation, the pipeline is capable of executing a much larger number of operations in the same amount of time if a sequence of similar operations is to be performed.

In general, the execution of an instruction may be broken down into the following discrete stages: instruction fetch, instruction decode, operand fetch, instruction execute, and result storage. It is also possible for these independent stages to be overlapped in some fashion so that the overall instruction throughput may be increased. According to a scheme of this type, the results of each pipeline stage are transferred to the next stage on the basis of a common system clock. For example, during a first clock cycle, an instruction is fetching by a functional unit dedicated to instruction fetching. During the second clock cycle, the fetched instruction is transferred to the instruction decode stage where a dedicated functional unit decodes the instruction; at the same time, the instruction fetch stage remains active and proceeds with fetching the subsequent instruction through the instruction fetch unit. In the following clock cycle, the result generated by each pipeline stage is shifted to the next stage of the pipeline while at the same time fetching another new instruction. This process continues until the final stage of the pipeline is activated, at which point the pipeline is filled. Subsequently, an instruction is completed by the final stage at the end of each subsequent clock cycle as long as new instructions continue to be fetched by the first pipeline stage.

Returning now to FIG. 1, each CPU 12 is essentially partitioned into at least three independent functional units: the memory access unit 16 (the M-Unit), the instruction unit 18 (the I-Unit), and the execution unit 20 (the E-Unit).

The M-Unit 16 provides the CPU interface to memory, I/O and other CPU units, and in particular, serves as means for accepting virtual memory references, translating the references into physical addresses, and initiating accesses to memory data, either in main memory 14 through appropriate interface means or within a local cache.

In the illustrative system of FIG. 1, the M-Unit 16 includes a main cache 18 which permits the instruction and E-Units 12 and 13 to access and process data at a much faster rate than permitted by the normal access time of the main memory 14. The main cache temporarily retains data (typically, the most recently used instructions and data items) that the processor is likely to require in executing current operations The cache interprets memory addresses by using an associative memory map which defines a correspondence between requested address locations and cache contents. The system operates by inhibiting requests to main memory and supplying data requested by the processor from the cache if the requested data item is found to exist within the cache The main memory 14 is accessed only when a requested data item is absent from the cache 18, in which case the data is fetched from the system memory and then supplied to the requesting unit. In short, the cache 18 operates on the phenomenon of locality in programs and provides a window into the system main memory and permits high-speed access to data references with spatial and temporal locality.

The main cache 22 includes means for storing selected pre-defined blocks of data elements, means for receiving memory access requests via a translation buffer 24 in order to access specified data elements, means for checking whether or not a specified data element exists within the block of memory stored in the cache, and means operative when data for the block including a specified data element is not within the cache for retrieving the specified block of data from the main memory 14 and storing it in the cache 22. Each time a requested data element is not found to be present within the cache 22, the entire block of data containing the data element is obtained from main memory 14. The next time the functional units of the processor request a data element from memory, the principle of locality dictates that the requested data element will most likely be found in the memory block which includes the previously addressed data element Since the cache 22 will be accessed at a much higher rate than main memory 14, it becomes possible for the main memory to have a proportionally slower access time than the cache without substantially degrading system performance. Consequently, the main memory 14 may be comprised of slower and less expensive memory elements.

The translation buffer 24 is a high speed associative memory which stores the most recently used virtual-to-physical address translations. In a virtual memory system of the type being discussed here, a reference to a single virtual address can produce several memory references before the desired memory information becomes available. The translation buffer 24, however, simplifies the translation process by reducing the translation of a virtual address to the corresponding physical address to merely searching for a "hit" in the buffer.

For the purpose of transmitting commands and input data to the computer system of FIG. 1 and for receiving data output from the system, an I/O bus 25 is linked to the main memory 14 and the main cache 22.

The I-Unit 18 includes a program counter 26 and an instruction cache 28 for fetching instructions from the main cache 22. The program counter 26 preferably addresses virtual memory locations rather than the physical memory locations of the main memory 14 and the cache 22. It is hence required that the virtual address put out by the program counter 26 be translated into the corresponding physical address of the main memory 14 before required instructions may be retrieved. This translation is accomplished by the translation buffer 24 in the M-Unit 16. The contents of the program counter 26 are transferred to the M-Unit 16 where the translation buffer 24 performs the address conversion. Subsequently, the required instruction is retrieved from its physical memory location either in the cache 22 or the main memory 14 and delivered on data return lines to the instruction cache 28. The organization and operation of the cache 22 and the translation buffer 24 are further described in chapter 11 of Levy and Eckhouse, Jr., *Computer Programming and Architecture, The VAX-11* Digital Equipment Corporation, pp. 351-368 (1980).

The instruction cache 28 generally has pre-stored instructions at the addresses specified by the program counter 26. The cache 28 is preferably arranged to receive and transmit instruction data in blocks of multiple data bytes in such a way that the memory addresses for the blocks are specified by specified bits in the address provided by the PC 26. The addressed instructions are then available immediately for transfer into an instruction buffer (I-Buf) 30 which essentially acts as a data latch for receiving instruction data on the basis of the clocking action of the system clock. From the I-Buf 30 the instructions are fed to an instruction decoder 32 which decodes both the operation codes (op-codes) and the specifiers which accompany the instructions. An operand processing unit (OPU) 33 produces memory or register addresses for the operands or evaluates the operand directly from the instruction stream in the case of literals. Register addresses and literals are supplied to the E-Unit 20. The addresses produced by the OPU 33 are also virtual and may represent virtual addresses for memory source (read) and destination (write) operands. In the case of memory read operands, the OPU 33 delivers these virtual addresses to M-Unit 16 for translation into physical addresses. The physical memory locations designated by the translation process are then accessed to fetch the operands for the memory source operands.

In the case of memory write operations, the data that is to be written does not become available until the execution of the instruction has been completed and it accordingly is required that the write address be stored until the data to be written becomes available. However, the translation of the virtual address of the destination to the corresponding physical address may be completed during the time required for executing the instruction. In addition, the OPU 33 may be used to advantage in increasing the rate of execution of instructions by pre-processing multiple instruction specifiers during the time an instruction is being executed. In order to accommodate these factors, the M-Unit 16 is provided with a write queue arrangement 34 which is disposed between the translation buffer 24 and the main cache 22. The write queue arrangement 34 essentially retains the translated address until the E-Unit 20 completes the instruction and relays the resulting data to the M-Unit 16 where it is paired with the stored write address and subsequently written into the cache 22 at the memory location specified by the translated physical address. A detailed description of a preferred write queue arrangement is provided in the above referenced co-pending D. Fite et al. United States Patent Application No. 07/306,767, filed Feb 3, 1989, entitled "Method And Apparatus For Resolving A Variable Number Of Potential Memory Access Conflicts In A Pipelined Computer System", which is also owned by the assignee of the present application.

In the case of an instruction requiring a memory read operation, the translation buffer 24 directly provides the physical address for an operand of the read instruction. Temporary storage means 36 are provided in M-Unit 16 for storage of translated addresses prior to their being used by the main cache 22 to access identified memory locations and deliver data stored therein to the E-Unit 20 via appropriate data return lines. Multiplexer and de-multiplexer units, respectively designated as 38 and 40, are provided in the memory unit 16 for selection of either the temporary storage unit 36 or the write queue 34 for interchange of translated addresses between the main cache 22 and the translation buffer 24.

In each instruction, the first byte contains the opcode and the following bytes are the operand specifiers to be decoded. The first byte of each specifier indicates the addressing mode for that specifier. This byte is usually broken into halves, with one half specifying the addressing mode and the other half specifying the register to be used for addressing. The instructions preferably have a variable length, and various types of specifiers may be used with the same op-code. A typical arrangement of this type is disclosed in Strecker et al., U.S. Pat. No. 4,241,397, issued Dec. 23, 1980.

The first step in processing the instructions is to decode the "opcode" portions of the instructions. The first portion of each instruction consists of its opcode which specifies the operation to be performed in the instruction, the number of specifiers and type of each specifier. The decoding is done using a table-look-up technique in the instruction decoder 32. The instruction decoder finds a microcode starting address for executing the instruction in a look-up table and passes the starting address to the E-Unit 20. Later, the E-Unit performs the specified operation by executing pre-stored microcode, beginning at the indicated starting address. Also, the decoder determines where source-operand and destination-operand specifiers occur in the instruction and passes these specifiers to the OPU 33 for pre-processing prior to execution of the instruction.

The look-up table is organized as an array of multiple blocks, each having multiple entries. Each entry in the look-up table can be addressed by its block and entry index. The opcode byte addresses the block, and a pointer from an execution point counter (indicating the position of the current specifier in the instruction) selects a particular entry in the block. The selected entry specifies the data context (byte, word, etc.), data type (address, integer, etc.) and accessing mode (read, write, modify, etc.) for each specifier.

After an instruction has been decoded, the OPU 33 parses the operand specifiers and computes their effective addresses; this process involves reading GPRs and possibly modifying the GPR contents by autoincrementing or autodecrementing. The operands are then fetched from those effective addresses and passed on to the E-Unit 20, which executes the instruction and writes the result into the destination identified by the destination pointer for that instruction. The OPU 33 also produces a specifier signal based on the opcode in each instruction.

Each time an instruction is passed to the E-Unit, the I-Unit sends a microcode dispatch address and a set of pointers for (1) the locations in the E-Unit register file where the source operands can be found, and (2) the location where the results are to be stored. Within the E-Unit, a set of buffer-based queues 42 includes a fork queue for storing the microcode dispatch address, a source pointer queue for storing the source-operand locations, and a destination pointer queue for storing the destination location. Each of these queues is a FIFO buffer capable of holding the data for multiple instructions.

The E-Unit 20 also includes a source operand list 44, which is stored in a multi-ported register file that also contains a copy of the GPRs. Thus, entries in the source pointer queue will either point to GPR locations for register operands, or point to the source list for memory and literal operands. Both the M-Unit 16 and the I-unit 18 write entries in the source list 44, and the E-Unit 20 reads operands out of the source list as needed to execute the instructions. For executing instructions, the E-Unit 20 includes an instruction issue unit 46, a microcode execution unit 48, an arithmetic and logic unit (ALU) 50, and an instruction retire unit 52.

According to an important feature of this invention, each pipeline stage is provided with a port into the front end of the M-Unit. This arrangement allows memory access requests processed by the M-Unit to be flagged conveniently as to the particular pipeline stage which initiated the request. Accordingly, a port associated with a memory access request which produces an exception can be isolated easily and deactivated or prevented from accepting further memory access requests from its associated pipeline stage until the exception has been appropriately acted upon.

In FIG. 1, the front end is represented by the translation buffer 24 which, as shown, has ports for receiving memory access requests from appropriate stages of the pipeline which are disposed in the I-Unit 18 and the E-Unit 20. In particular, the I-Buf 30 is linked through the instruction cache 28 to a corresponding front-end port 24A on the M-Unit 16. The OPU 33 is linked to its corresponding front-end port 24B and a front-end port 24C is provided for the E-Unit stages. It will be apparent that other discrete ports may be provided for distinct stages of the pipeline which generate memory access requests and the representation of ports in FIG. 1 is merely intended for illustrative purposes and not as a limitation.

Figure 2:
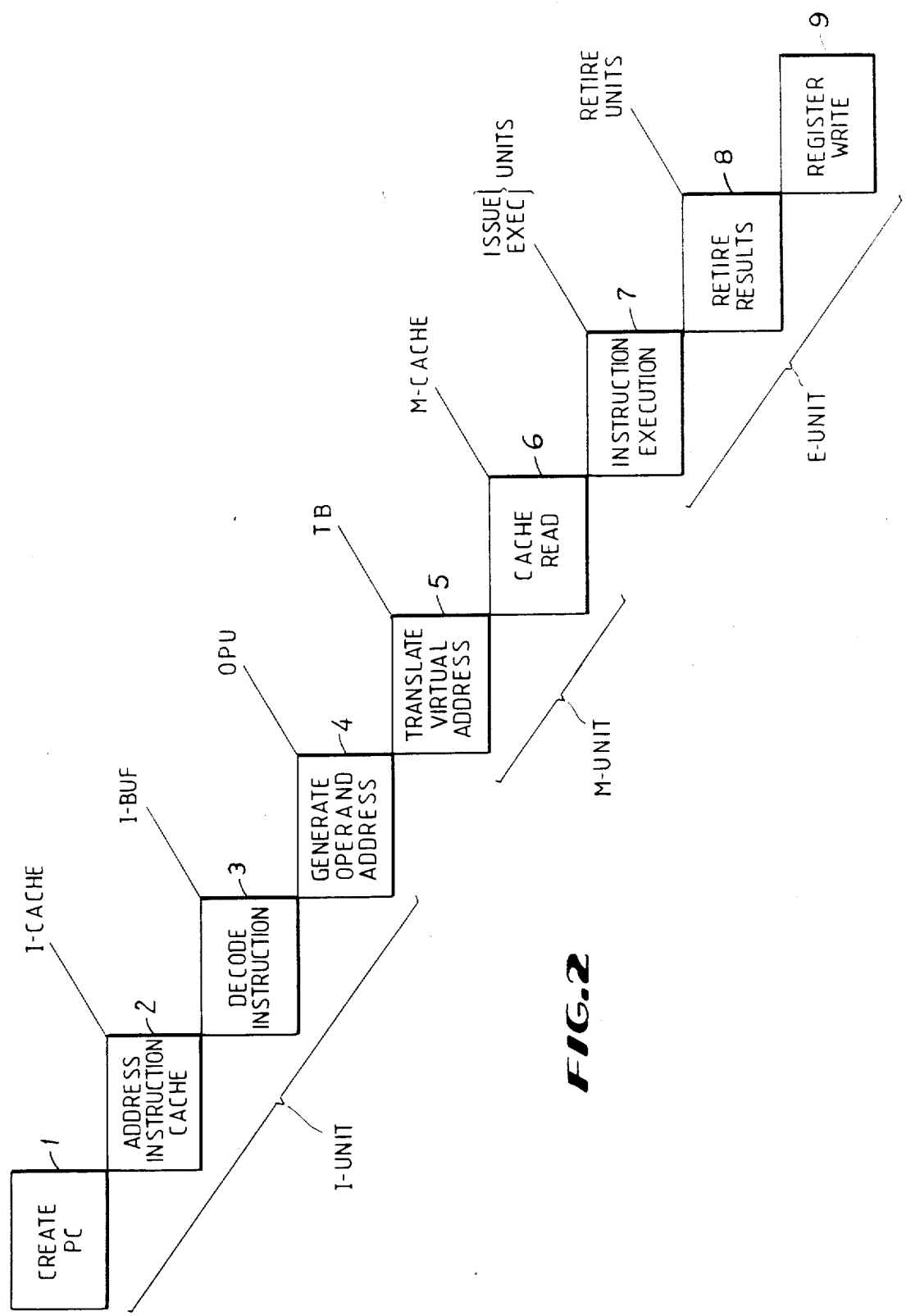
FIG. 2 is an illustration of the various pipeline states involved in executing a typical instruction.

The various pipeline stages involved in executing a typical instruction will now be described with reference to FIG. 2. As discussed above, in a pipelined processor the processor's instruction fetch hardware may be fetching one instruction while other hardware is decoding the operation code of a second instruction, fetching the operands of a third instruction, executing a fourth instruction, and storing the processed data of a fifth instruction. FIG. 2 illustrates a pipeline for a typical instruction such as:

*ADDL3 RO,B^12(R1),R2.*

This is a long-word addition using the displacement mode of addressing.

In the first stage of the pipelined execution of this instruction, the program counter (the PC 26 in FIG. 1) of the instruction is created. This is usually accomplished either by incrementing the program counter from the previous instruction, or by using the target address of a branch instruction. The PC is then used to access the instruction cache 28 in the second stage of the pipeline.

In the third stage of the pipeline, the instruction data is available from the cache 22 for use by the instruction decoder 32, or to be loaded into the instruction buffer 30. The instruction decoder 32 decodes the opcode and the three specifiers in a single cycle, as will be described in more detail below. The operand addresses RO and R2 are passed to the ALU unit 50, and the operand is sent to the OPU 33 R1 along with the byte displacement at the end of the decode cycle.

In stage 4, the operand unit 33 reads the contents of its GPR register file at location R1, adds that value to the specified displacement (in this case 12), and sends the resulting address to the translation buffer 24 in the M-Unit 16, along with an OP READ request, at the end of the address generation stage.

In stage 5, the M-Unit 16 selects the address generated in stage 4 for execution. Using the translation buffer 24, the M-Unit 16 translates the virtual address to a physical address during the address translation stage. It is at this stage that any faults resulting from the address translation are detected and corresponding fault information generated. According to this invention, the resulting fault information is placed in storage and a pertinent segment of the fault information is passed along with the results generated by the current stage to be acted upon at a later stage. The generation of fault information and its eventual use will be described below in detail. The physical address is then used to address the cache 22, which is read in stage 6 of the pipeline.

In stage 7 of the pipeline, the instruction is issued to the ALU 27 which adds the two operands and sends the result to the retire unit 28. It will be noted that during stage 4, the register values for R1 and R2, and a pointer to the source list location for the memory data, are sent to the E-Unit and stored in the pointer queues. Then during the cache read stage, the E-Unit looks for the two source operands in the source list. In this particular example it finds only the register data in RO, but at the end of this stage the memory data arrives and is substituted for the invalidated read-out of the register file. Thus both operands are available in the instruction execution stage. Instruction execution essentially involves the stages of instruction issuance followed by actual execution using designated operands.

According to this invention, the data resulting from the completion of prior stages of the pipeline is checked for the presence of fault information at the execution stage. If any fault indication is detected, further fault information, previously stored when the fault was originally detected, is recalled and an exception handling routine is invoked, as will be explained below.

In the retire stage 8 of the pipeline, the result data is paired with the next entry in the retire queue. Although several functional E-Units can be busy at the same time, only one instruction can be retired in a single cycle.

In the last stage 9 of the illustrative pipeline, the data is written into the GPR portion of the register files in both the E-Unit 20 and the I-Unit 18.

In accordance with this invention, memory access requests are lodged by those stages in the instruction pipeline which require virtual-to-physical memory address translation. These requests are lodged at the corresponding port provided on the front end of the M-Unit. The virtual addresses associated with lodged memory access requests are processed to determine the presence of a predefined set of memory access violations. If no violation is found to exist, the memory access request is granted and the associated memory operation completed in a normal manner. However, if a violation is found to exist, the associated virtual address is stored along with a code identifying the particular type of access violation that is encountered. A fault signal indicative of the presence of a violation is then generated and the information contained therein is propagated along with the resulting data relayed along subsequent pipeline stages to the E-Unit. When this data is required by the E-Unit in order to execute an instruction, the data is checked by the E-Unit for the presence of the fault signal. If the signal is found to exist, the fault address and code previously stored in the M-Unit are retrieved and a corresponding predefined exception handler routine is invoked.

The virtual addresses accompanying lodged memory access requests can be originated as a result of the operation of the translation buffer 24 (FIG. 1) when it is operating with a localized cache of recently used virtual-to-physical conversions or the action of an associated translation buffer fix-up unit adapted to handling address translation when the localized translation buffer cache does not contain required address conversions. A detailed description of the functional composition of the translation buffer 24, an associated fix-up unit, and operational details pertinent thereto is provided in the above-identified Hetherington U.S. Patent Application Ser. No. 07/306,544, filed Feb. 3, 1989, entitled "Method And Apparatus For Controlling The Conversion Of Virtual To Physical Memory Addresses In A Digital Computer System", incorporated herein by reference, which is also owned by the assignee of the present application. To facilitate the understanding of the present invention, the operation of the translation buffer and the fix-up unit is briefly described below with reference to FIGS. 3 and 4.

Figure 3:
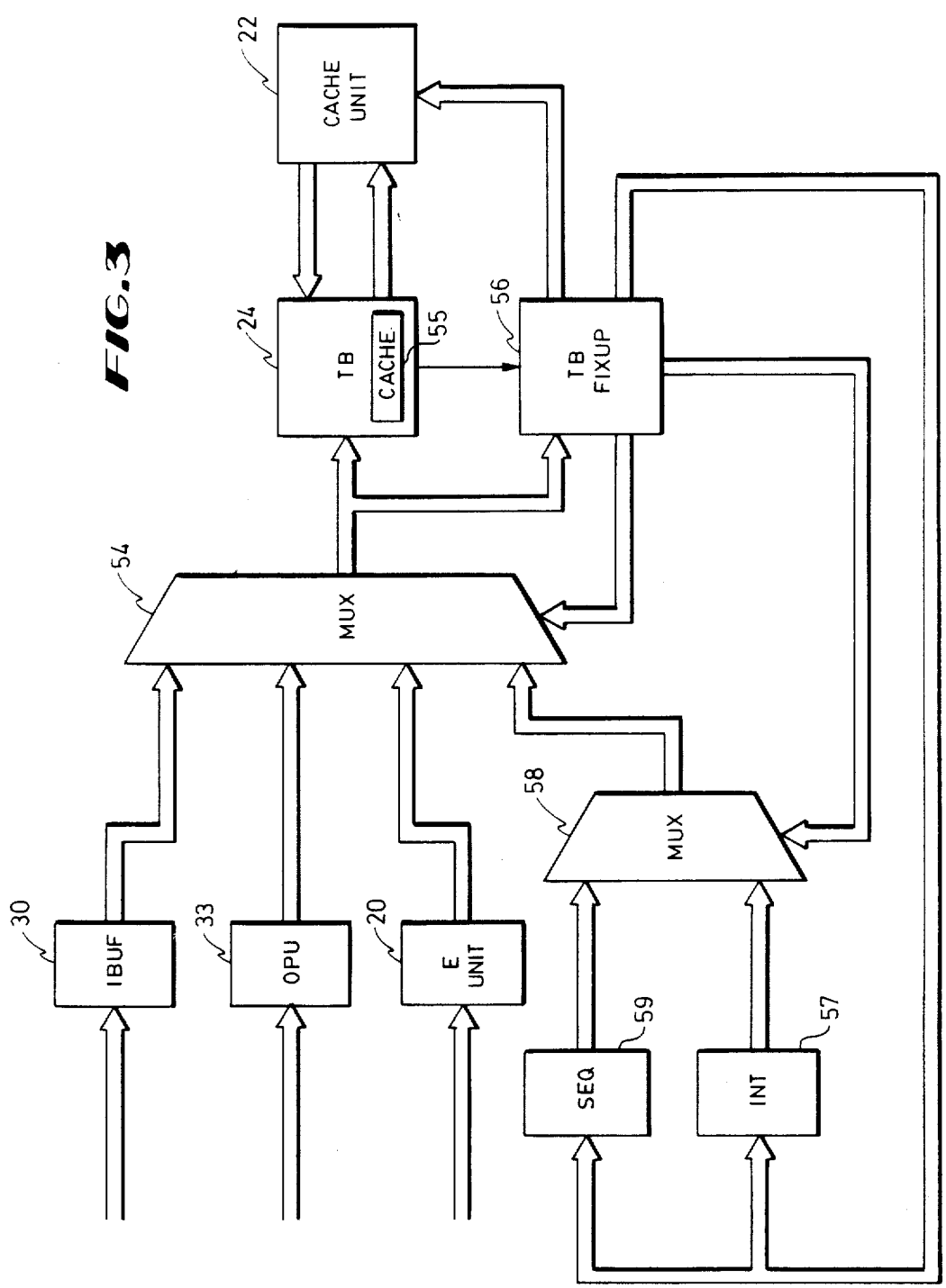
FIG. 3 is a block diagram illustrating the functional blocks involved in the translation of virtual to physical addresses using the translation buffer shown in FIG. 1.

Referring first to FIG. 3, the operation of the translation buffer 24 is described in greater detail. The translation buffer 24 is connected to receive virtual addresses from five different sources. Three of these sources are external to the memory access unit 16 and are, hereafter, generally referred to as external. The remaining two sources are controlled from within the memory access unit 16 and are, hereafter, generally referred to as internal. These internal registers are used during translation buffer "misses" to retrieve the virtual-to-physical translation from memory and place it in the translation buffer 24.

The external sources include the I-buffer 30 which is part of the I-Unit 18 and is responsible for delivering instruction pre-fetch addresses, the OPU 33 which delivers operand pre-fetch addresses, and the E-Unit 20 which delivers implicit operand addresses. The action of the translation buffer 24 is independent of the particular external address being processed, as all addresses are handled identically.

Each of these external sources is delivered to the inputs of a multiplexer 54 which controllably delivers the selected input to the translation buffer 24. The translation buffer 24 compares the received virtual address to a cache 55 of recently used virtual-to-physical address conversions. If a match is found, the translation buffer 24 selects the corresponding physical address and delivers it to the cache 22. There is no need to access the cache 22 to fetch the virtual-to-physical translation since it is already present in the translation buffer cache 55 by virtue of its earlier use. In this respect, the translation buffer 24 greatly enhances processor speed by reducing the number of accesses to memory.

However, the translation buffer cache 55 contains only a small number of the virtual-to-physical translations. Thus, it is possible that the virtual address currently being translated is not present in the translation buffer cache 55. When this happens, it is necessary to retrieve the conversion from memory and place it in the translation buffer cache 55, so that the virtual-to-physical conversion can be completed.

The virtual address delivered by the selected external source is also delivered to a translation buffer fixup unit (TB Fixup) 56. As its name implies, TB Fixup 56 is primarily dedicated to retrieving those conversions not present in the translation buffer cache 51 and placing them in the translation buffer 24. The particular operation of currently being processed. To understand this distinction, it is first necessary to explain the configuration of virtual memory.

Virtual address space is actually broken into several functional regions or segments. First, virtual address space is divided into two halves called system space and process space. Process space is again broken into the program (P0) and control (P1) regions. Each region has a collection of all of the virtual-to-physical address translations for that region of memory. These translations are collectively referred to as page tables while the individual translations are referred to as page table entries (PTE). Each region has its own page table and is defined by two registers: a base register containing the page table starting address and a length register containing the number of page table entries in the table.

The virtual address is a binary number 32 bits in length with the two high order bits defining the regions of memory. For example, bit 31 defines system and process space. A one in this position indicates system space while a zero identifies process space. Bit 30 further defines the two process regions (P0,P1). The high-address half of process space is the control region (P1) while the low-address half is occupied by the program region (P0).

The high-address half of the address space is called system space because it is shared by all programs in the system and the operating system runs in this region. There is only one page table for system space, the system page table (SPT), that translates all system space reference. SPT is described by its two hardware registers, the system base register (SBR) and the system length register (SLR). These registers are loaded by the software when the operating system is booted. It is important to note that SPT must be referenced by physical addresses, since there can be no virtual-to-physical address conversion without the page table itself. For example, in order for the conversion process to begin, the physical address of at least the SPT must be known to retrieve the virtual-to-physical conversions.

The low-address half of memory is called process space because, unlike system space, process space is unique to each program in the system. Each program has its own page table for its program and control regions, and they are defined by the corresponding base and length registers (P0BR, P1BR, P0LR, and P1LR). For example, different programs referencing the same process space virtual address will access different physical memory locations. Accordingly, the process page tables are referenced by virtual, rather than physical, memory addresses. Thus any conversion of process space virtual addresses must first locate the physical memory location of the process page table. These addresses are available in the physical memory locations of the system page table (SPT). It can be seen that while a conversion of a system memory reference can be accomplished in a single step, a process memory reference must perform two conversions: first, the conversion of the Process base register address and second, the conversion of the virtual address itself.

The program region (P0) contains user programs, thereby providing the zero-based virtual address space into which programs expect to be loaded. Conversely, the control region (P1) accommodates the user mode stack of the process. The operating system can also use the control region to contain protected process-specific data and code, as well as the stacks for the higher access modes.

Referring, once again, to FIG. 3 TB Fixup 56 receives the virtual address from the multiplexer 50 and uses bits 30 and 31 to determine the virtual memory region being accessed. The designated region is used to determine which base register should be used to locate the corresponding page table. For a system memory reference, the page table address computed from SBR is a physical address and can be delivered directly to the memory access unit cache 22 where the corresponding virtual-to-physical conversion is stored. However, it is only necessary to fix the translation buffer 24 when a "miss" occurs. Accordingly, the translation buffer 24 delivers a miss signal to the TB Fixup 56 to allow the computed address to be delivered to the cache 22. In the event of a TB "miss", the conversion is retrieved from the cache 22 and stored in the translation buffer cache 55. Thus, the immediately subsequent comparison of the translation buffer cache 55 to the pending virtual address must necessarily result in a "hit". Therefore, TB Fixup 56 temporarily asserts control over the translation buffer 24 to update the translation buffer cache 55, whereby the pending conversion is altered from a "miss" to a "hit" and the virtual-to-physical translation is completed.

Conversely, where the virtual memory region being accessed corresponds to the process region, the address computed from either of the process base registers POBR, P1BR is a virtual address. This virtual address cannot be delivered to the cache 22, but must first be converted to a physical address. Of course, conversion of virtual to physical addresses is normally accomplished by the translation buffer 24. Since the translation buffer 24 is currently stalled, waiting for TB Fixup 56 to update its cache 51, TB Fixup 56 can assert control over the translation buffer to perform this virtual-to-physical conversion. TB Fixup 56 delivers the computed virtual address of the process page table to an internal register 57 in response to the translation buffer "miss". A multiplexer 58 is selected by TB Fixup 56 to deliver the contents of the internal register 57 to an input of the multiplexer 54. TB Fixup 56 also operates to select the output of the multiplexer 58 as the input to the multiplexer 54. It can be seen that a translation buffer "miss" on a process memory reference results in the computed virtual address of the process page table being delivered to the translation buffer 24 for a virtual-to-physical conversion. Thus, a "hit" in the translation buffer 24 at this time results in the physical address being delivered directly to the cache 22 by the translation buffer 24.

It is also possible that a second translation buffer "miss" will result on the address contained in the internal register 56. TB Fixup 56 can also correct this second "miss". The fixup routine is identical to that used to retrieve the PTE for a system reference "miss". The retrieved PTE is stored in the translation buffer cache and is used to form the physical address of the virtual-to-physical translation on a subsequent pass through the translation buffer 24.

A sequencer 59 also receives input from TB Fixup 56 over the same bus as the internal register 57. The sequencer 59 is employed during multi-precision operations where it is necessary to read multiple contiguous bytes from memory. The sequencer 59 increments the address and delivers it to the multiplexer 58. TB Fixup 56 controls which of the multiplexer inputs are selected to deliver consecutively, first, the internal register address, and second, the incremented address of the sequencer. All bytes of a multi-byte operation are accessed in this manner.

Figure 4:
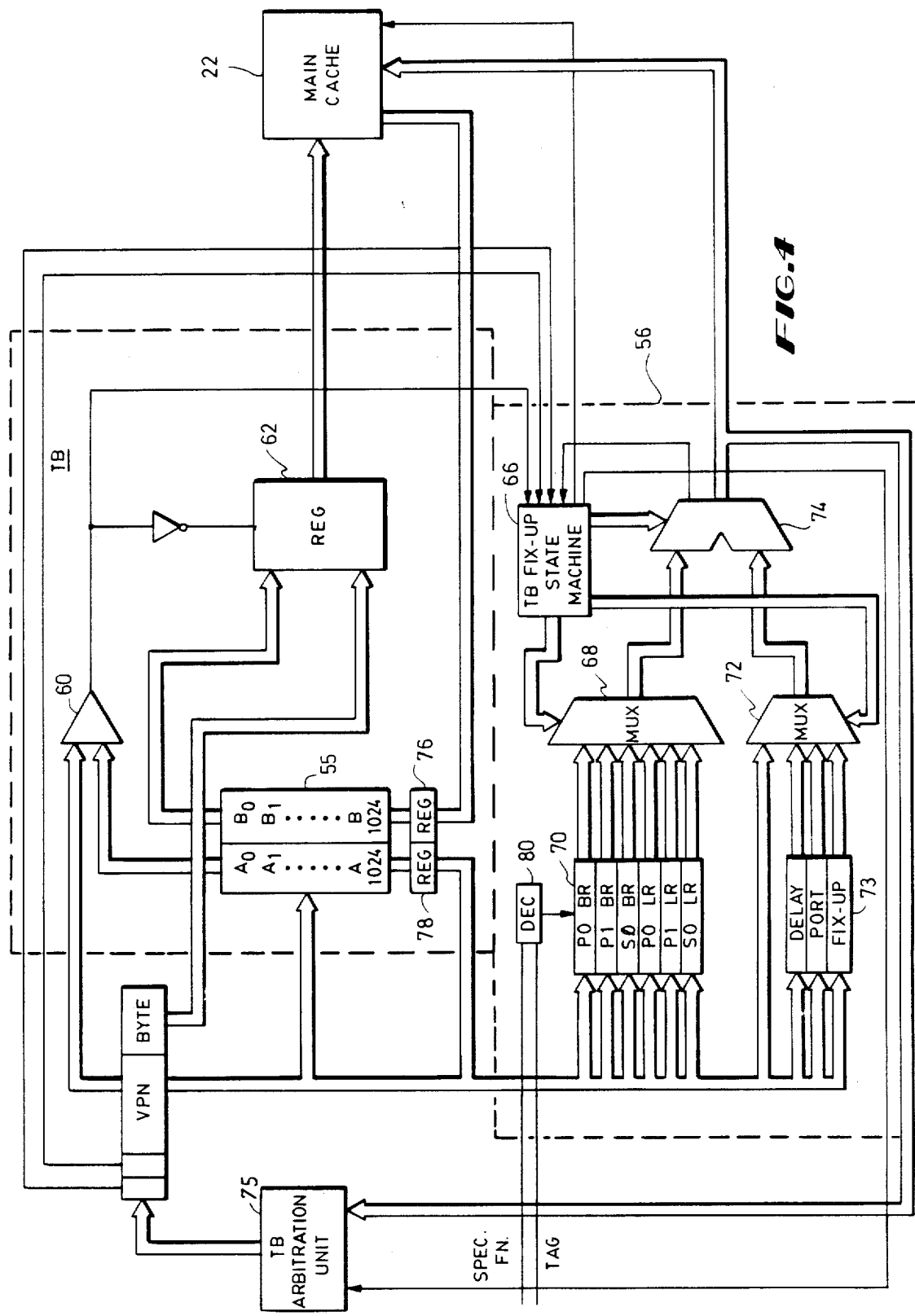
FIG. 4 is a more detailed block diagrammatic representation of the organization of the translation buffer and the translation buffer fix-up unit shown in FIG. 3.

Referring now to FIG. 4, a detailed block diagram of the translation buffer 24 and TB Fixup 56 is shown. The translation buffer 24 maintains the cache 55 of recently used PTEs. The 32-bit virtual address is received by the translation buffer 30 and bits 31 and 17:09 are used as pointers for the 1024 memory locations of the cache 55.

Each memory location in the cache 55 has a 13-bit tag corresponding to bits 30:18 of the virtual address. These tags are indicated as $A_0$–$A_{1024}$ and are collectively referred to as the page translation directory. The lower 512 tags correspond to process memory references and the upper 512 tags correspond to system memory references. The purpose of separating the tags into process and system tags is to allow the operating system to quickly invalidate only those tags associated with the current program when a context switch occurs. For example, if these entries are not invalidated when another program begins to execute, this next program could access the wrong physical memory location by generating a process virtual address which had been previously translated by the prior program. Thus, rather than the translation buffer 24 detecting a "miss", a tag match will result based on the virtual-to-physical translation of the prior program.

The system tags need not be invalidated after a context change since all processes share system space and the virtual-to-physical translations will be identical for each process. Consequently, a system memory reference from any program will access the same physical memory location, so there is no need to flush the system tags. Bit 31 separates the process tags from the system tags.

Associated with each of the tags $A_0$–$A_{1024}$ is a 32-bit data field containing the corresponding PTE and indicated as $B_0$–$B_{1024}$. The PTE includes the physical page frame number PFN at bits 24:00, a valid bit at bit 31, a protection field at bits 30:27, and a modify bit at bit 26. These PTEs are collectively referred to as the page translation store.

A comparator 60 receives bits 30:18 of the virtual address and the 13-bit tag corresponding to the pointer. A match between these values indicates that the PTE corresponding to the virtual address is located in the page translation store at the location corresponding to the tag bits. Bits 29:09 of the selected PTE are delivered to one input of a register 62. The other input to the register 62 is formed from bits 08:00 of the virtual address. In other words, the corresponding physical page is appended to the byte offset of the virtual address, forming the actual physical address. This physical address is maintained in the register 62 which is clocked by an inverted pulse from the comparator 60. Thus, the calculated physical address is delivered to the cache 22 only if the comparator 60 indicates that a "hit" was found in the page translation directory.

At the same time, the VPN (bits 29:09) is delivered to the TB Fixup 56. A state machine 66 controls the operation of the TB Fixup 56 in response to control inputs from the comparator 60 (TB miss), and bits 31:30 of the virtual address. The state machine 66 responds to the TB miss signal by calculating the address of the desired PTE. In general, the PTE is determined by adding the VPN and the address of the base register.

The status of bits 31:30 determines the particular base register that is used for computing the PTE. As discussed previously, there are three separate areas of memory, each having its own unique page table and base address. The state machine 66 interprets the bits 31:30 and delivers a control signal to the select input of a multiplexer 68, whereby the appropriate base register can be selected. The inputs to the multiplexer 68 are connected to a series of six registers 70 containing the base and length registers (P0BR, P1BR, SBR, P0LR, P1BR, and SLR) of each area of memory.

The state machine 66 also controls the select inputs of a multiplexer 72 which is linked to the outputs of a series of three address registers forming a register set 73 adapted to temporarily store virtual addresses corresponding to different types of TB "miss" states. More specifically, a "port miss" register is provided for storing the virtual address corresponding to a first "miss" in processor memory, a "fix-up miss" register is provided for storing the virtual address corresponding to a "miss" resulting from a successive reference to the translation buffer from the fix-up unit, and a "delay miss" register is provided for storing the virtual address corresponding to a "miss" which requires a delayed fix-up action. The response of the fix-up unit to these stored virtual addresses will be described below. During any "miss" in system memory or a first "miss" in process memory, the state machine 66 selects the port miss address input to the multiplexer 72 which contains bits 21:2 of the virtual address. The lowest order two bits are not needed since the PTE is stored in the cache 28 on longword alignment (4 bytes). The multiplexers 68, 72 deliver their outputs to an adder 74 where they are combined to form the address of the PTE. The address is delivered to an arbitration unit 75 or to the cache 22.

Along with the address, the state machine 66 delivers request signals to either the arbitration unit 75 or the cache 22, depending upon whether the calculated address is a physical or virtual address. The request signals act to enable one of the arbitration unit 75 and cache 22. For example, an address calculated from a process base register is a virtual address and cannot be delivered to the cache 22, but must undergo a virtual-to-physical translation in the translation buffer 24. Accordingly, the state machine 66 delivers the request signal to the arbitration unit 75. The arbitration unit 75 corresponds to the multiplexer 54, shown in FIG. 3, and operates to deliver the signals from the external registers or the internal registers based upon a priority scheme. The internal registers, sequencer 59 and internal 57, have the highest priority. Thus, when the state machine 66 delivers the request signal to the arbitration unit 75, the internal registers are selected over the external registers to allow the TB Fixup routine to proceed without conflict from the external registers.

Conversely, an address calculated from a system base register is a physical address and can be delivered directly to the cache 22 to retrieve the desired PTE. The PTE is retrieved from memory and delivered to a register 76. Bits 30:18 of the corresponding virtual address are delivered to a register 78. The contents of the registers 76, 78 are stored at the locations indicated by the pointer, so as to update the translation buffer cache 55 with the most recently used virtual-to-physical translation.

There is a possibility that the second reference to the translation buffer 24, during a process memory "miss", will also result in a "miss". TB Fixup 56 is capable of handling this double "miss". The state machine 66 recognizes the double miss condition when the second consecutive "miss" signal is received from the comparator 60. The state machine 66 selects the system base register via the multiplexer 68 and the fixup miss address via the multiplexer 72. The port miss address register remains loaded with the original virtual address which resulted in the first "miss". The adder 74 combines these selected signals to arrive at the physical system address of the process base register. Since this is a system memory reference, the address identifies a physical memory location and can be delivered directly to the cache 22 along with the cache enable signal. Here the process is substantially identical to an original system memory reference, and the cache 22 will respond by delivering the PTE stored at the identified address to the translation buffer cache 55. Thus, when the external register is again selected by the arbitration unit 75, the translation buffer 24 will necessarily "hit" on the virtual-to-physical translation.

According to the translation buffer fix-up routine, before the TB Fixup 56 calculates the PTE address, a fault check is performed to determine if the virtual address has violated a length parameter of the page table. More simply stated, the number of available pages in an area of memory is known, and a virtual page that is greater than the number of pages in memory must be the result of a system error. The adder 74 is used to make this comparison. The state machine 66 configures the adder 74 to perform a 2's complement subtraction by inverting the inputs from the multiplexer 72 and enabling the carry in bit. For this process, the two lowest order bits are necessary for the calculation, so rather than selecting the port miss address input, the state machine selects the delay miss address input to the multiplexer 72 to retrieve bits 21:0 of the virtual address.

The state machine 66 also selects the length register 70 corresponding to the area of memory being translated. Thus, by subtracting the virtual address from the known length of the page table, a negative result indicates that the virtual address is attempting to access a nonexistent PTE. Alternatively, a positive result indicates no length violation exists and the fixup process is allowed to proceed.

The state machine 66 monitors this process via the carry out bit of the adder 74. If the carry out bit is asserted, the result is negative and a fault command is issued to the E-Unit 20.

In addition to correcting "misses" in the translation buffer 24, the TB Fixup 56 also aids in retrieving data during multi-precision operations. These multi-precision instructions require access to multiple memory locations even though only a single memory location is identified in the instruction. Thus, while the first memory reference is passed to the translation buffer 24, TB Fixup 56 calculates the next sequential address and delivers it to the sequencer 59. The virtual address is delivered to the zero input of the multiplexer 72 and selected by the state machine 66. At the same time, a constant, having a value of four, is located at the zero input of the multiplexer 68 and is selected by the state machine 66. Therefore, the output of the adder 74 is the virtual address of the next longword needed for the multi-precision instruction. This address is delivered to the arbitration unit 75 where it takes priority over the external registers and is translated to a physical address by the translation buffer 24.

Finally, the process for loading the base and length registers 70 is controlled by the E-Unit 20 during the initialization phase of the CPU. The E-Unit 20 provides a 4-bit tag address and an enable signal to a decoder 80. The decoder 80 responds by enabling the corresponding register 70 to input the data present in the virtual address. The process is repeated for each of the base and length registers 70 until all of the registers have been loaded with the appropriate data.

Figure 5:
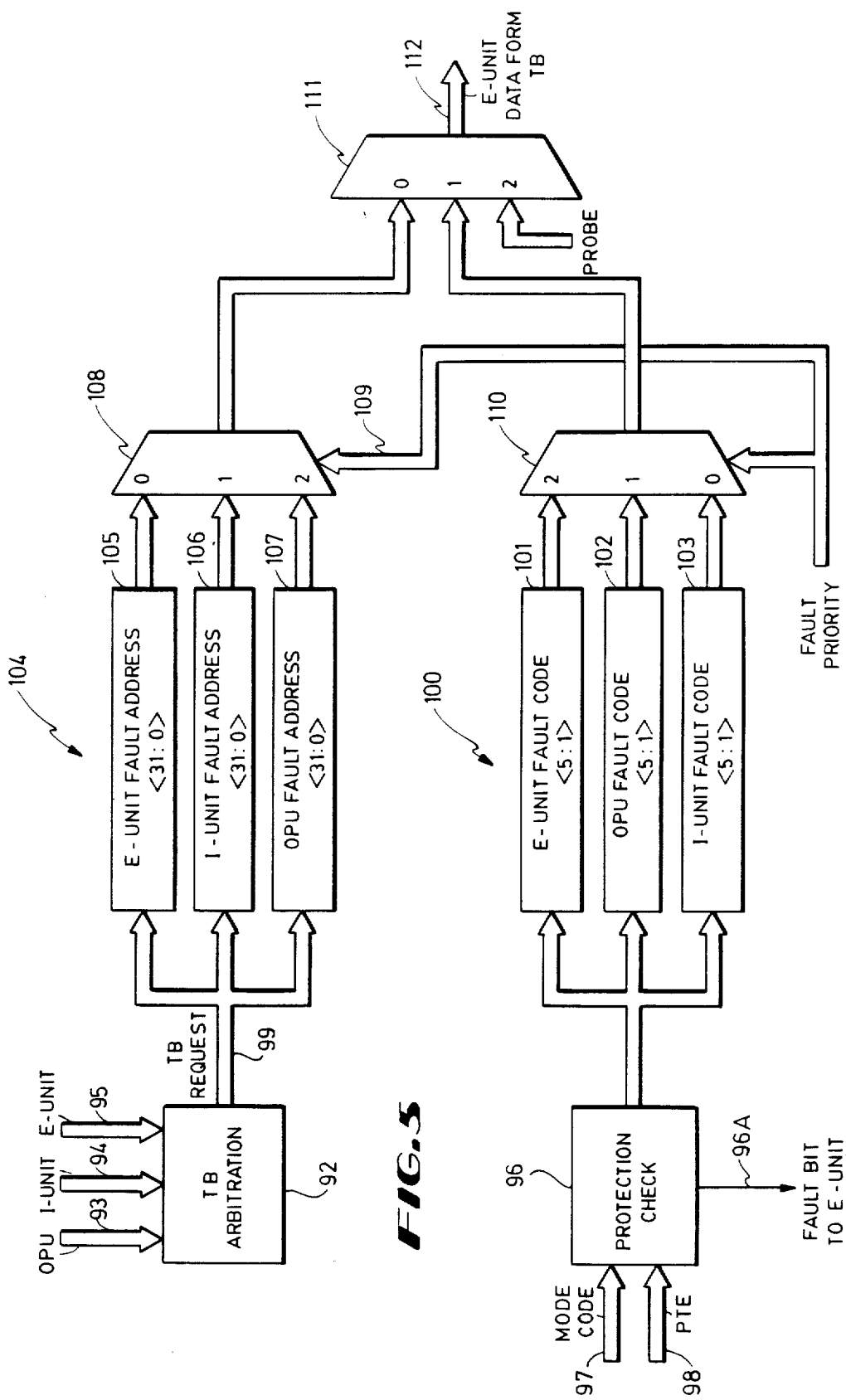
FIG. 5 is a block diagram illustrating the generation of fault information according to the exception handling scheme of this invention.

Referring now to FIG. 5, there is shown a block diagram illustrating a preferred arrangement for generation of fault information according to the exception handling scheme of this invention. As shown therein, virtual addresses associated with memory access requests that are received at the individual ports on the front end of the M-Unit (reference numeral 16 in FIG. 1) are accepted by an arbitration unit 92 through communication links 93, 94, and 95 which correspond respectively to the OPU 33 (see FIG. 1), I-Unit 18, and the E-Unit 20 respectively. The arbitration unit 92 is adapted to select the address corresponding to one of the three external ports that are defined at the M-Unit on the basis of a predefined priority scheme. As discussed above with reference to the operation of the translation buffer and the translation buffer fix-up unit, the virtual addresses being processed are preferably 32-bit addresses generated by those stages in the instruction execution pipeline which require access to memory. One of the three virtual addresses received at its input ports is selected for processing by the arbitration unit 92 and put out as the translation buffer request address that is used subsequently to access address segments of memory. The arbitration unit 92 essentially functions to relay signals from the external or the internal virtual address sources on the basis of a priority scheme which provides the internal sources with a higher priority than the external sources.

It should be noted that the virtual addresses received at the arbitration unit could be originated directly from the external sources as a result of a translation buffer "hit" operation or through the internal sources as a result of the action of the translation buffer fix-up unit subsequent to a "miss" operation during the process of translating virtual addresses to corresponding physical addresses in the system memory. The particular virtual address selected by the arbitration unit is relayed to a protection check unit 96 which processes the accepted virtual address to determine the presence of a predefined set of memory access violations. According to a preferred embodiment, the protection check unit 96 is adapted to monitor the presence of at least the five types of memory access violations that are listed below at table A.

TABLE A

| TYPE OF VIOLATION | ASSERTED BIT IN FAULT CODE |
|---|---|
| ACCESS MODE | 1 |
| INVALID TRANSLATION | 2 |
| LENGTH | 3 |
| INVALID PPTE | 4 |
| MODIFY | 5 |

If it is found that the virtual address in question corresponds to one of the predefined memory access violations, a fault signal 96A indicative of the presence of a violation is generated. The fault signal 96A is preferably in the form of a single bit flag which is added to and passed along with the data relayed along subsequent pipeline stages until it eventually reaches the execution stage in the E-Unit.

In order to perform the protection check, check unit 96 receives a 32-bit PTE 98 which corresponds to the virtual address being processed and is generated as a result of the virtual-to-physical address translation process discussed above in detail. It will be recalled that the PTE includes the physical page frame number PFN at bits 20:00, a "valid" bit at bit 31, a protection field comprising bits 30:27, and a "modify" bit at bit 6. In functional terms the protection check unit 96 is a state machine adapted to check the status of specified bits in the 32-bit PTE 98 in order to determine the presence of corresponding predefined memory access violations. More specifically, bit 31 of the PTE 98 is checked to see whether or not it is asserted. As described above, bit 31, when asserted, represents a valid bit signifying that the corresponding page number is resident in memory; when bit 31 is not asserted the virtual address corresponding to that PTE does not have a corresponding valid translation. If the check unit 96 finds that the bit 31 of the PTE is not asserted, it generates the fault signal 96A indicating the presence of an access violation.

The protection check unit 96 also checks the modify bit in the bit information represented by the PTE 98. If that bit is not asserted it is an indication that the particular page in memory referenced by the PTE does not have write access and signifies the presence of a memory access violation.

The check unit 96 also monitors the PTE 98 for length violations to determine if the virtual address accompanying a memory access request is attempting to access a nonexistent PTE, as described in detail above with reference to FIG. 4. Again, if a length violation is found to exist, the fault signal 96A is generated.

Similarly, the PTE 98 is also checked to see if an invalid entry is being referred to in the page table for the process section of system memory; this means that the process PTE or PPTE is invalid. If the result is positive, the fault signal 96A is generated.

Another type of memory access violation that is recognized by the protection check unit 96 is a mode access violation based upon a memory access request that transcends the current mode in which the processor unit is operating. For instance, a memory access request may originate during operation of the system in the user mode and yet address memory segments in the supervisory mode; it is imperative that such requests be identified as access violations. In order to accomplish this, the check unit 96 is provided with a two-bit code 97 representing the mode under which the system is being operated at the time that the protection check is being performed.

In accordance with this invention, the detection of a predefined memory access violation is followed by the generation of a fault code identifying the particular kind of violation that has been detected. More specifically, a separate bit in a fault code field is designated for each of the predefined access violations listed above in table A. For instance, bit 1 of the 5-bit fault code is set if a mode access violation is found, bit 2 is asserted if an invalid translation violation exists, bit 3 is asserted if a PPTE violation exists, and bit 5 is asserted if a modify violation is detected. A 5-bit fault code is generated for each of the external virtual address sources and stored separately in corresponding 5-bit code registers. More specifically, a register set 100 is provided in which a 5-bit register 101 is adapted to receive and store the fault code generated in correspondence to the virtual address originating from the E-Unit. Similarly, a 5-bit register 102 is proVided for storing the fault code corresponding to the OPU and another 5-bit register 103 is provided for storing the fault code corresponding to the I-Unit.

At the same time that an access violation is detected by the protection check unit 96 and the corresponding fault signal 96A generated, the virtual address corresponding to the violation is relayed as a translation buffer request 99 and is subsequently stored in a corresponding register of register set 104. The register set includes a 32-bit address register 105 for storing the virtual address which is determined by the check unit as representing a memory access violation which is generated by the E-Unit. Similarly, address register 106 is provided for storing the 32-bit virtual address generated by the I-Unit and a 32-bit register 107 is provided for storing the virtual address corresponding to the OPU.

The fault address information stored in registers 105–107 is linked to a multiplexer 108. The MUX 108 is provided with a select signal designated as the fault priority signal 109 which determines the order in which stored fault addresses are channeled out in case more than one fault address is found to be active in the address registers when the stored fault information is subsequently recalled. The fault address information and the fault code information that is stored in the register sets 100 and 104 is retained within the M-Unit until the E-Unit requests the transfer of the fault parameters. Such a request is originated when the instruction is acted upon by the E-Unit at the execution stage and a check for the presence of the 1-bit fault signal is found to be positive.

According to a feature of this invention, fault information generated in response to memory access violations which are initiated by the E-Unit is designated as taking precedence over fault information generated by the OPU which, in turn, is designated as having a higher priority than I-Unit faults. In effect, faults are processed in the order of execution dictated by the pipeline stages in the E-Unit. The reason for placing E-Unit faults at the highest level in the fault priority scheme is that completion of operations in the E-Unit pipeline stages is indispensable to execution of a current instruction. This is not the case with the OPU stage which is adapted to the processing of pre-fetched instructions and operands which are not essential to the completion of a current instruction. The fault priority signal is preferably a 2-bit control signal which selects the E-Unit address register data as the output of MUX 104 if valid fault addresses exist simultaneously in the E- and I- Unit address registers 105 and 106 respectively.

On a similar basis, the fault code information stored in the registers 101–103 is fed to a MUX 110 which generates, on the basis of the same fault priority signal that is fed to MUX 108, an output 111 representing one of the three 5-bit codes input to it. The 32-bit fault address generated from MUX 108 is combined with the 5-bit fault code generated by MUX 110 at a third MUX 111 so that, in effect, the fault address and the corresponding fault code constitute the fault data that is relayed out to the E-Unit as the fault parameters requested by the E-Unit when a fault indication is detected at the execution stage. It should be noted that the fault parameters are relayed along the same lines that are normally used to transfer data from the M-Unit to the E-Unit.

Figure 6:
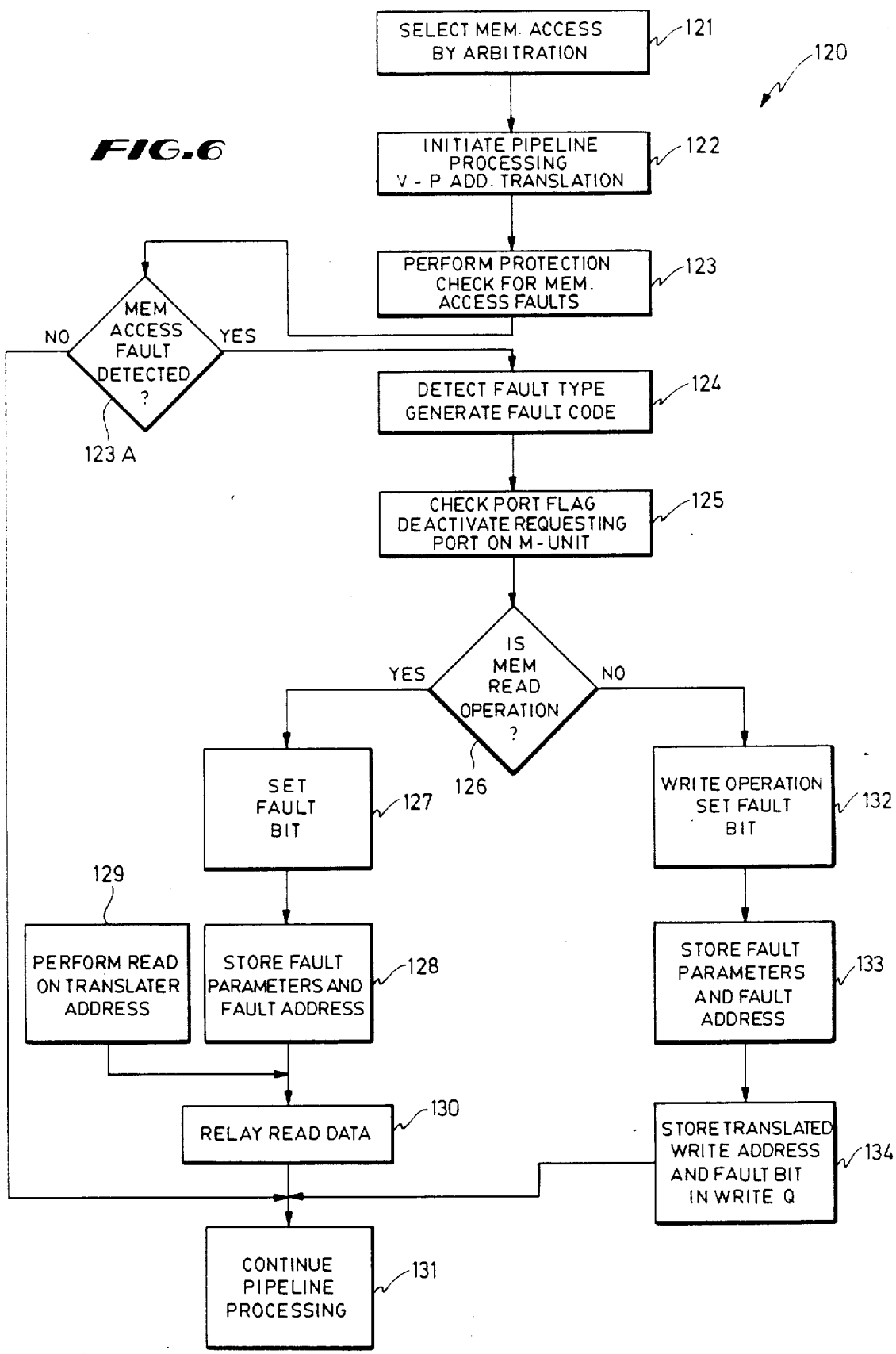
FIG. 6 is a simplified flowchart illustrating the sequence of operations involved in the generation of fault information and related codes and parameters.

Referring now to FIG. 6, there is shown a flowchart 120 embodying the procedural steps undergone by the system in the identification and generation of memory access exceptions or faults. At step 121, a memory access request corresponding to one of the external source ports provided on the M-Unit is selected for processing. Subsequently, at step 122 the virtual address corresponding to the selected memory access request is processed and undergoes the virtual-to-physical address translation.

At step 123, the protection check is performed upon the information (in particular, the PTE) generated as a result of the translation process. The checking procedure detects the presence of the predefined set of memory access faults. A determination is made at step 123A as to whether or not any memory access violations or faults exist. If the answer at step 123A is positive, step 124 is accessed. If no memory access violation is detected pursuant to the check preformed at step 123A, the system automatically continues with the pipelined processing of other memory access requests at step 131.

At the next step 124, the particular type of access fault is identified and the corresponding fault code generated by the protection check unit. Subsequently, at step 125, the external port originating the request leading to the detected memory access violation is deactivated on the M-Unit. Next, at step 126 a determination is made as to whether or not the requested memory access corresponds to a read operation.

If the answer at step 126 is found to be in the affirmative, step 127 is reached where the fault signal indicative of the presence of a memory access violation is generated by asserting a fault bit which is propagated along the pipeline with the results of the memory access request. At step 128, the fault parameters, including the virtual fault address and the fault code generated as a result of the protection checking process, are stored in corresponding registers in the M-Unit.

At the subsequent step 129, the read operation is performed upon the translated physical address corresponding to the virtual address being currently processed. At step 130 the read data is propagated in combination with the asserted fault bit along the succeeding pipeline stages until the data is stored within the source list 44 (see FIG. 1) within the E-Unit. Subsequently, at step 131 the system continues with the pipelined processing of memory access requests related to those M-Unit front-end ports which have not been affected by the deactivation performed at step 125.

If the answer at step 126 is found to be in the negative, it is an indication that the memory access request corresponds to a write operation and step 132 is accessed where the fault signal is generated by asserting the fault bit. At step 133, the fault information comprising the virtual fault address and the fault code identifying the port originating the request are stored as fault parameters for subsequent use. At step 134, the translated physical address is stored along with the asserted fault bit in the write queue arrangement 34 (see FIG. 1) instead of being propagated along the succeeding pipeline stages.

The actual write operation has to be postponed in this manner because the data that has to be written is not available until after the execution stage. When the data is in fact available, the translated destination addresses which are stored within the write queue are paired with the corresponding data received from the E-Unit. Accordingly, instructions may be conveniently retired by writing the E-Unit data at the corresponding pre-translated destination address, thereby saving the time that would otherwise be required in performing the virtual-to-physical address translation at this point. Following the execution of step 134, the system accesses step 131 where the pipelined processing of other outstanding memory access requests from ports which have not been deactivated at step 125 is continued.

Referring now to FIG. 7, there is shown a flowchart illustrating the sequence of operations involved in detecting the presence of and responding to fault information. As shown therein, the detection and response process for memory read operations is initiated at step 141. At step 142, the read data representing the source operand is retrieved from the source list 44 (FIG. 1) in the E-Unit 20. At step 143, the fault bit associated with the stored data is examined and a determination is made at step 144 as to whether or not the fault bit is asserted. If the fault bit is not found to be asserted, step 145 is accessed where the instruction is executed in a normal fashion using the data retrieved from the source list as the operand for the read operation.

However, if the answer at step 144 is found to be positive, i.e., the fault bit is indeed asserted, step 146 is accessed where the micro-engine of the system is trapped so that execution of the micro-code which controls the pipelined instruction execution process is halted. Subsequently, at step 147, the E-Unit 20 accesses the M-Unit 16 and requests that the corresponding fault parameters stored in the fault address registers and the fault code registers inside the M-Unit be transmitted over to the E-Unit. Upon receiving the fault parameters from the M-Unit, the fault code is decoded by the E-Unit in a conventional manner and a corresponding one of a set of predefined trap routines is invoked for processing the particular type of memory access violation that has been detected. The definition of such trap routines for handling excess violations is conventional and accordingly will not be described here in detail.

It should be noted that the trapping of the system micro-engine at step 146 occurs only if an instruction which has resulted in a memory access violation has reached the execution stage in the E-Unit and the corresponding read or write data is absolutely essential to execution of the instruction. The exception processing scheme of this invention accordingly provides a distinct advantage over conventional techniques where trap routines are invoked in response to access violations at the point in the pipeline stage where the violation is detected. With such schemes, the processing activities of all succeeding of pipeline stages are disrupted. In addition, such conventional fault processing schemes result in substantial wastage of time because trap routines get invoked even for those operations which are eventually cancelled prior to execution of the instruction as a result of events occurring at succeeding stages of the pipeline. These problems are avoided by the present invention because the stored fault parameters are recalled only at the point of final execution of the instruction so that trap routines are invoked only when it is essential that the memory access exception be processed prior to executing the instruction.

In the flowchart of FIG. 7, the processing of fault information in the case of memory write operations is initiated at step 150 and is followed, at step 151, by the retrieval of Write data that is generated by the E-Unit and which needs to be written into the segment of memory whose address has been previously stored in the M-Unit. At step 152, the corresponding address entry in the write queue arrangement 34 (see FIG. 1) is retrieved from the M-Unit.

Subsequently, at step 153, the fault bit also stored in association with the write queue entry is examined. At step 154 a determination is made as to whether or not the fault bit has been asserted. If the answer is found to be in the negative, the system accesses step 155 where execution of the instruction is proceeded with in a normal fashion by using the retrieved address entry from the write queue as the destination operand. However, if the fault bit is indeed found to be asserted at step 154, the system executes steps 146, 147, 148, and 149 in the manner identical to that used with the processing of memory read operations. More specifically, the system micro-engine is trapped, the fault parameters previously stored in the M-Unit are recalled, the fault code included therein is decoded, and the corresponding trap routine invoked in order to process the fault.

The exception handling scheme described above is particularly adapted to handling efficiently exception information encountered in the processing of memory references which may or may not be required for subsequent instruction execution even when the instruction is completed (as is the case for execution of variable length bit field operations specified by base, position, and size operands). Where an address translation problem results in the generation of exception information only for the base address while the corresponding real field address has no access violation, the port corresponding to the pipeline stage where the exception is encountered is not deactivated. Instead, the exception information is pipelined onto the execution stage where a determination of the real field is made. If the field is not found to be active at that point, the fault information is dismissed and the real field data is fetched. With this arrangement, other operand data can be pre-fetched in the meantime without any flow problems since the instruction flow does not change direction.

We claim:

1. A method of processing memory access exceptions encountered during pipelined instruction execution in a virtual memory-based computer system, said instruction execution being performed by using an instruction pipeline having a plurality of pipeline stages, each of said pipeline stages being dedicated to performing a predefined one of several tasks into which an instruction is divided, said computer including an instruction unit (I-Unit) for fetching and decoding instructions and fetching instruction operands, an execution unit (E-Unit) for performing specified operations upon instruction operands, a system memory indexed by physical addresses, and a memory unit (M-Unit) including a translation buffer for converting virtual addresses delivered by the I- and E-Units to physical addresses within the system memory, said pipeline stages including an execution stage in the E-Unit, and preceding pipeline stages in the E- and I-Units which require virtual-to-physical address translations prior to instruction execution in the execution stage in order for one of the preceding pipeline stages to send valid results of said address translation down said instruction pipeline and through an intermediate one of the preceding pipeline stages which processes said valid results before said valid results reach said execution stage, said method comprising the steps of:

receiving memory access requests, including memory read or write operations, from said preceding pipeline stages in said E- and I-Units which require virtual-to-physical address translations;

using said translation buffer to translate virtual addresses accompanying a memory access request into corresponding physical address;

checking said virtual addresses and the results of said address translation to determine presence of one or more of a predefined set of memory access violations; generating fault information and invalid results in response to said presence of one or more of the predefined set of memory access violations;

pipeline selected segments of said fault information and said invalid results along said instruction pipeline from said preceding pipeline stages to said execution stage; and detecting the presence of said pipelined segments of fault information when said pipelined segments of fault information reach said execution stage, and in response thereto invoking a predefined exception handler routine corresponding to the memory access violation associated with said detected fault information so that the invocation of said exception handler routine is delayed past time that said one of said preceding pipeline stages sends said invalid results down said instruction pipeline and past the time that said invalid results pass through said intermediate one of said preceding pipeline stages.

2. The exception processing method of claim 1 wherein memory access requests from pipeline stages within said E- and I-Units are accepted by the M-Unit at separate ports defined in correspondence to said pipeline stages, and wherein the port corresponding to the pipeline stage initiating a memory access request which results in a memory access violation is prevented from accepting further memory access requests.

3. The exception processing method of claim 2 wherein said fault information includes flag information indicative of the presence of a memory access violation, a fault code identifying the type of memory access violation detected, and a fault address corresponding to the virtual address associated with said detected violation.

4. The exception processing method of claim 3 wherein said selected segments of said fault information consists of said flag information, and the fault code and fault address are stored within said M-Unit, 5. A method of processing memory access exceptions during the operation of a pipelined computer system; said computer system having a memory unit, an instruction unit and an execution unit interconnected to form an instruction pipeline for processing instructions; said instruction unit including means for fetching and decoding instructions to obtain operation codes and source and destination operand specifiers, and means for fetching source operands specified by said source operand specifiers; said execution unit including means for performing operations specified by said operation codes upon said source operands, means for fetching additional operands and means for retiring results of said operations; said memory unit including means for performing virtual-to-physical address translation, a first port connected to said means for fetching source operands, and a third port connected to said means for fetching additional operands; said method comprising the steps of:

(a) sensing when memory access requests by said means for fetching instructions and means for fetching source operands cause a memory access violation, and in response to said memory access violation generating fault information and inhibiting the processing of additional memory requests from the respective means for fetching having caused the memory access violation;

(b) pipelining from said memory unit to said execution unit fault information about faults generated by said means for fetching instructions and means for fetching source operands, the fault information being pipelined in parallel with the instruction pipeline, said execution unit also receiving fault information about faults generated by said means for fetching additional operands, and (c) in response to receiving the fault information, said execution unit invoking a predefined exception handing routine corresponding to the memory access violation associated with the received fault information so that the initiation of exception handling to resolve memory access violations caused by the fetching of instructions and the fetching of source operands is delayed until the fault information being pipelined in parallel with the instruction pipeline is received by the execution unit.

6. The method of claim 5 wherein the fault information generated in step (a) includes flag information indicative of the presence of a memory access violation, a fault code identifying the type of memory access violation detected, and a fault address corresponding to the virtual address associated with said detected violation.

7. The method of claim 6 wherein the only portion of said fault information generated in step (a) that is pipelined or passed to the execution unit in step (b) is said flag information, and the fault code and fault address are stored within said memory access unit.

8. The method of claim 5 wherein said execution unit in step (c) invokes said exception handling routine when the instruction having caused the fault would have been issued in the absence of the fault.

9. A pipelined computer system comprising a memory unit, an instruction unit and an execution unit interconnected to form an instruction pipeline for processing instructions; said instruction unit including means for fetching and decoding instructions to obtain operation codes and source and destination operand specifiers, and means for fetching source operands specified by said source operand specifiers; said execution unit including means for performing operations specified by said operation codes upon said source operands, means for fetching additional operands and means for retiring results of said operations; said memory unit including means for performing virtual-to-physical address translation, a first port connected to said means for fetching instructions in said instruction unit, a second port connected to said means for fetching source operands in said instruction unit, and a third port connected to said means for fetching additional operands in said execution unit; said memory unit further including means for sensing when memory access requests by said means for fetching instructions and means for fetching source operands cause a memory access violation, and means responsive to the sensing of a memory access violation for generating fault information and inhibiting the processing of additional memory requests from the respective means for fetching having caused the memory access violation; said computer system further including means for pipelining from said memory unit to said execution unit fault information about faults generated by said means for fetching instructions and means for fetching source operands, the fault information being pipelined in parallel with the instruction pipeline, said memory unit also being connected to said execution unit for passing fault information about faults generated by said means for fetching additional operands; and said execution unit further comprising means responsive to the received fault information for invoking a predefined exception handling routine so that the initiation of exception handling to resolve the memory access violations caused by the fetching of instructions and the fetching of source operands is delayed until the fault information being pipelined in parallel with the instruction pipeline is received by the execution unit.

10. The computer system of claim 9 wherein said means for generating includes means for generating flag information indicative of the presence of a memory access violation, a fault code identifying the type of memory access violation detected, and a fault address corresponding to the virtual address associated with said detected violation.

11. The computer system of claim 10 wherein said memory access unit includes means for storing said fault code and said fault address, and wherein said means for pipelining includes means for pipelining said flag information.

* * * * *